United States Patent
Huang (10) Patent No.: US 11,074,879 B2
(45) Date of Patent: Jul. 27, 2021

(54) DRIVE CIRCUIT OF DISPLAY DEVICE, DISPLAY DEVICE AND DISPLAY PANEL

(71) Applicants: HKC Corporation Limited, Guangdong (CN); Chongqing HKC Optoelectronics Technology Co., Ltd., Chongqing (CN)

(72) Inventor: Xiaoyu Huang, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 364 days.

(21) Appl. No.: 16/251,092

(22) Filed: Jan. 18, 2019

(65) Prior Publication Data

US 2020/0105211 A1  Apr. 2, 2020

Related U.S. Application Data

(63) Continuation of application No. PCT/CN2018/114452, filed on Nov. 8, 2018.

(30) Foreign Application Priority Data

Sep. 30, 2018  (CN) .......................... 201811165770.6

(51) Int. Cl.
*G09G 3/36* (2006.01)
*G02F 1/1345* (2006.01)

(52) U.S. Cl.
CPC ....... *G09G 3/3614* (2013.01); *G02F 1/13454* (2013.01); *G09G 2300/0426* (2013.01); *G09G 2310/08* (2013.01)

(58) Field of Classification Search
CPC .. G09G 3/2092; G09G 3/2096; G09G 3/3614; G09G 5/006; G09G 2370/22; G09G 5/00–42; G09G 2300/0426; G09G 2310/08; G09G 2370/00–24; G09G 3/3696; G09G 2310/0254; G09G 3/20–2096; G09G 2310/0289; G09G 2370/08; G09G 2370/10; G09G 5/18; G09G 2310/0291; G09G 2370/14; G09G 5/003; G02F 1/13454; H03K 5/00–5/26; H03K 2005/00013–00293
See application file for complete search history.

(56) References Cited

U.S. PATENT DOCUMENTS

| 2008/0116933 | A1  |  5/2008 | Ishiyama |
| 2008/0278428 | A1* | 11/2008 | Song ................... G09G 3/3696 345/98 |
| 2010/0220094 | A1* |  9/2010 | Watanabe ............. G11C 19/28 345/213 |

(Continued)

FOREIGN PATENT DOCUMENTS

| CN | 101377911 A | 3/2009 |
| CN | 102446484 A | 5/2012 |

(Continued)

*Primary Examiner* — Amr A Awad
*Assistant Examiner* — Aaron Midkiff (57) ABSTRACT

Disclosed are a drive circuit of a display device, a display device and a display panel. The drive circuit of the display device drives a first drive signal output branch and a second drive signal output branch to output a preset logic level signal separately by drive signals of a timing controller.

18 Claims, 2 Drawing Sheets

(56) References Cited

U.S. PATENT DOCUMENTS

2012/0242302 A1\* 9/2012 Yonezawa ............. H02M 3/158
　　　　　　　　　　　　　　　　　　　　　　323/234
2017/0330508 A1\* 11/2017 Saito ................... G09G 3/3225

FOREIGN PATENT DOCUMENTS

| CN | 102855862 A | 1/2013 |
|---|---|---|
| CN | 203260299 U | 10/2013 |
| CN | 104332142 A | 2/2015 |
| CN | 104635569 A | 5/2015 |
| CN | 106023932 A | 10/2016 |
| JP | 2004198928 A | 7/2004 |
| JP | 2017067959 A | 4/2017 |
| KR | 20160092090 A | 8/2016 |

\* cited by examiner

DRIVE CIRCUIT OF DISPLAY DEVICE, DISPLAY DEVICE AND DISPLAY PANEL

CROSS REFERENCE TO RELATED APPLICATIONS

The present application is a Continuation Application of PCT Application No. PCT/CN2018/114452 filed on Nov. 8, 2018, which claims the benefit of Chinese Patent Application No. 201811165770.6, filed on Sep. 30, 2018, which is incorporated herein by reference in its entirety.

FIELD OF THE DISCLOSURE

The present application relates to the technical field of display device, and in particular, to the drive circuit, display device, and display panel for display device.

BACKGROUND OF THE DISCLOSURE

Among the existing display panel technologies, TFT-LCD (Thin Film Transistor (TFT) Liquid Crystal Display) is one of the main types of panel display, and has become an important display platform in modern IT and video products. The main driving principle of TFT-LCD is: the system motherboard connects the R/G/B compression signal, control signal and power source to the connector on the PCB through wire. Once the data is processed by the TCON (Timing Controller) IC on the PCB, it will connect to the display area through the PCB board, the S-COF (Source-Chip on Film) and the G-COF (Gate-Chip on Film), so that the LCD can obtain the power source and signal required. During the process of driving the liquid crystal panel, PCBA requires multiple logic control signals. In the prior art, each logic control signal directly outputs the required high/low level through the I/O port of the TCON IC. However, as the control process becomes complicated, more and more logic control signals are needed.

SUMMARY OF THE DISCLOSURE

The main purpose of the present application is to provide a drive circuit for the display device, which aims to solve the problem that the quantity of I/O ports for display device is insufficient in the prior art.

To achieve the purpose above, the present application provides a drive circuit for the display device, and the drive circuit for the display device comprises:

a timing controller having a first output end for outputting drive signal, it is configured to output a drive signal, wherein one cycle of the drive signal includes N pulses that output sequentially;

a first drive signal output branch, comprising a first trigger circuit and a first assignment circuit, the first trigger circuit is configured to output a first level signal according to the current pulse of the drive signal and a first assignment signal output by the first assignment circuit, and when a rising edge of the drive signal is detected, it will trigger the first assignment circuit to output a polarity-reversed second assignment signal, so that the first trigger circuit will output a second level signal based on the current pulse of the drive signal and the second assignment signal; wherein, the plurality of second level signals output by the first trigger circuit in one cycle form one drive signal of the display device;

a second drive signal output branch, comprising a second trigger circuit, a delay circuit and a second assignment circuit, the second trigger circuit is configured to output a third level signal according to the drive signal and a third assignment signal output by the second assignment circuit, and when a rising edge of the drive signal is detected, it will trigger the second assignment circuit to output a polarity-reversed fourth assignment signal, so that the second trigger circuit will output a fourth level signal based on the drive signal and the fourth assignment signal, the delay circuit delays the fourth level signal and outputs it at the next rising edge of the drive signal as the other drive signal of the display device when the rising edge of the drive signal is detected.

The first drive signal output branch comprises a signal output end and a controlled end, and the second drive signal output branch comprises a signal output end and a controlled end, the first output end of the timing controller is respectively connected to the controlled end of the first drive signal output branch and the controlled end of the second drive signal output branch; the signal output end of the first drive signal output branch is connected to the first port of the display device, and the signal output end of the second drive signal output branch is connected to the second port of the display device.

The first drive signal output branch comprises a first trigger circuit and a first assignment circuit; the second drive signal output branch comprises a second trigger circuit, a delay circuit, and a second assignment circuit;

The controlled end of the first trigger circuit is a controlled end of the first drive signal output branch, the input end of the first trigger circuit is connected to the output end of the first assignment circuit, the connection node of the input end of the first trigger circuit and the output end of the first assignment circuit is a signal output end of the first drive signal output branch; the controlled end of the second trigger circuit is connected to the controlled end of the delay circuit, the connection node of the controlled end of the second trigger circuit and the controlled end of the delay circuit is a controlled end of the second drive signal output branch, the input end of the second trigger circuit is connected to the output end of the second assignment circuit, the output end of the second trigger circuit is connected to the input end of the delay circuit, the output end of the delay circuit is connected to the input end of the second assignment circuit, the connection node of the delay circuit and the second assignment circuit is an output end of the second drive signal output branch.

The first trigger circuit comprises a first trigger and a first resistor, and the first trigger comprises a controlled end, an input end and an output end; the controlled end of the first trigger is connected to the first output end of the timing controller, the input end of the first trigger is an input end of the first trigger circuit, the output end of the first trigger is connected to the first end of the first resistor, and the connection node of the first trigger and the first resistor is an output end of the first trigger circuit; the second end of the first resistor is grounded.

The first assignment circuit comprises a first power switch tube and a second power switch tube, the first power switch tube comprises a controlled end, a first connection end, and a second connection end, and the second power switch tube comprises a controlled end, a first connection end and a second connection end; the controlled end of the first power switch tube is connected to the controlled end of the second power switch tube, the connection node of the controlled end of the first power switch tube and the controlled end of the second power switch tube is an input end of the first assignment circuit, and the first connection end of the first power switch tube is connected to a first power source, the second connection end of the first power switch tube is connected to the first connection end of the second power switch tube, the connection node of the second connection end of the first power switch tube and the first connection end of the second power switch tube is an output end of the first assignment circuit; the second connection end of the second power switch tube is grounded.

The second trigger circuit comprises a second trigger and a second resistor, and the second trigger comprises a controlled end, an input end and an output end; the controlled end of the second trigger is connected to the first output end of the timing controller, the input end of the second trigger is an input end of the second trigger circuit, the output end of the second trigger is connected to the first end of the second resistor, and the connection node of the second trigger and the second resistor is an output end of the second trigger circuit; the second end of the second resistor is grounded.

The second assignment circuit comprises a third power switch tube and a fourth power switch tube, the third power switch tube comprises a controlled end, a first connection end, and a second connection end, and the fourth power switch tube comprises a controlled end, a first connection end and a second connection end; the controlled end of the third power switch tube is connected to the controlled end of the fourth power switch tube, the connection node of the controlled end of the third power switch tube and the controlled end of the fourth power switch tube is an input end of the second assignment circuit, and the first connection end of the third power switch tube is connected to a second power source, the second connection end of the third power switch tube is connected to the first connection end of the fourth power switch tube, the connection node of the second connection end of the third power switch tube and the first connection end of the fourth power switch tube is an output end of the second assignment circuit; the second connection end of the fourth power switch tube is grounded.

The delay circuit comprises a third trigger and a third resistor, the controlled end of the third trigger is connected to the first output end of the timing controller, the input end of the third trigger is an input end of the third trigger module, the output end of the third trigger is connected to the first end of the third resistor, and the connection node of the third trigger and the third resistor is an output end of the third trigger module; the second end of the third resistor is grounded.

The first power switch tube and the second power switch tube are MOS transistors or triodes.

The third power switch tube and the fourth power switch tube, the third power switch tube and the fourth power switch tube are MOS transistors or triodes.

The first power switch tube and the third power switch tube are P-MOS transistors.

The second power switch tube and the fourth power switch tube are N-MOS transistors.

The first trigger, the second trigger and the third trigger are respectively rising edge D triggers.

To achieve the purpose above, the present application also provides a display device, comprising the drive circuit for the display device.

To achieve the purpose above, the present application also provides a display panel, comprising the display device.

In the drive circuit for the display device provided in the present application, the drive circuit for the display device comprises a timing controller, a first drive signal output branch, and a second drive signal output branch. The drive circuit for the display device of the present application can output logic level in a regular manner according to the number of pulses of the drive signal by the combination of the first trigger circuit and the first assignment circuit. Similarly, the second trigger circuit and the second assignment circuit can be combined to output logic level in a regular manner according to the number of pulses of the drive signal. At this time, the logic level signal of the second trigger circuit and the second assignment circuit is further delayed by the delay circuit, so that the regularity of the logic level output by the second drive signal output branch and the regularity of the logic level output by the first drive signal output branch are inconsistent, such that the logic level output by the first drive signal output branch and the logic level output by the second drive signal output branch may be the same or different under the same number of pulses, therefore, a plurality of output states are formed. At this time, the regularity of the plurality of output states can be determined according to the delay pulse number of the delay circuit, so that the first drive signal output branch and the second drive signal output branch are driven by the drive signal to output the preset logic level signals respectively. Therefore, the purpose of obtaining a drive signal through an I/O port and then controlling drive circuit for the display device to the output two adjustable logic levels is accomplished, solving the problem that the number of I/O ports for display device in the prior art is insufficient.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

With reference to the drawings, the implement of the object, features and advantages of the present application will be further illustrated in conjunction with embodiments.

DETAILED DESCRIPTION OF THE EMBODIMENTS

It should be understood that the specific embodiments described herein are only for illustrating but not for limiting the present application.

The technical solutions in the embodiments of the present application will be clearly and completely described hereafter in connection with the embodiments of the present application. It is apparent that the described embodiments are just a part of the embodiments of the present application, but not the whole. Based on the embodiments of the present application, all the other embodiments obtained by that of ordinary skill in the art without inventive effort are within the scope of the present application.

It should be noted that all directional indications (such as up, down, left, right, front, back, . . . ) in the embodiments of the present application are only used to explain the relative positional relationship, motion situation and the like between components in a certain posture (as shown in the drawings), if the specific posture changes, the directional indication shall also change accordingly.

In addition, the descriptions of "second", "plurality" and the like in this application are used for the purpose of description only, and are not to be construed as indicating or implying their relative importance or implicitly indicating the number of technical features indicated. Thus, features defined with "second", "plurality" may include at least two such features, either explicitly or implicitly. In addition, the technical solutions between the various embodiments may be combined with each other, provided that those skilled in the art can implement it, and when the combination of the technical solutions is contradictory or impossible to implement, it should be considered that the combination of these technical solutions does not exist, nor is it within the scope of protection required by this application.

The present application provides a drive circuit for the display device for solving the problem that the number of I/O ports for display device is insufficient without increasing the number of I/O ports for display device, so that the display device can transmit all the drive signals that need to be transmitted through the existing insufficient I/Os.

Figure 1:
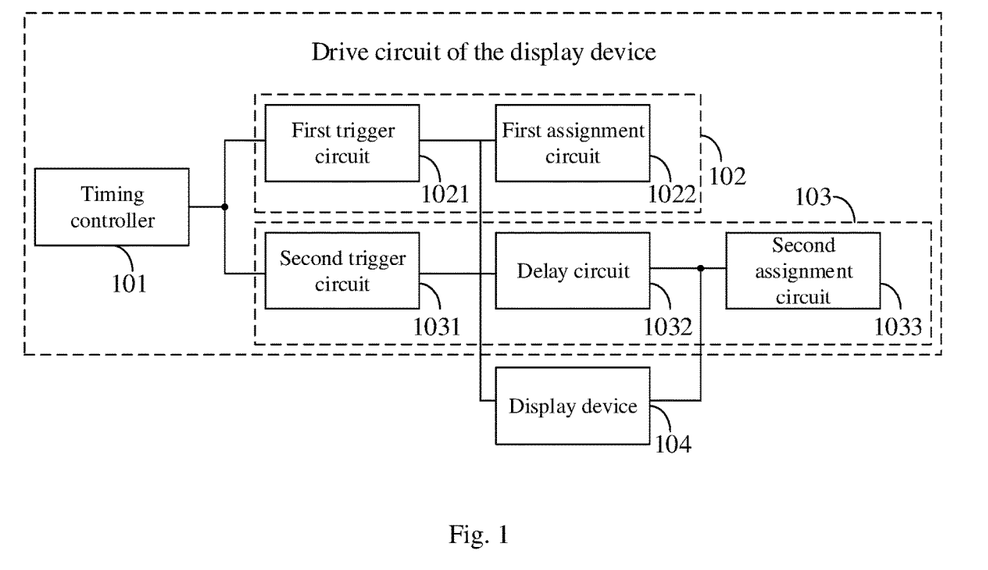
FIG. 1 is a diagram showing the module structure of the drive circuit for the display device according to the present application.
Figure 2:
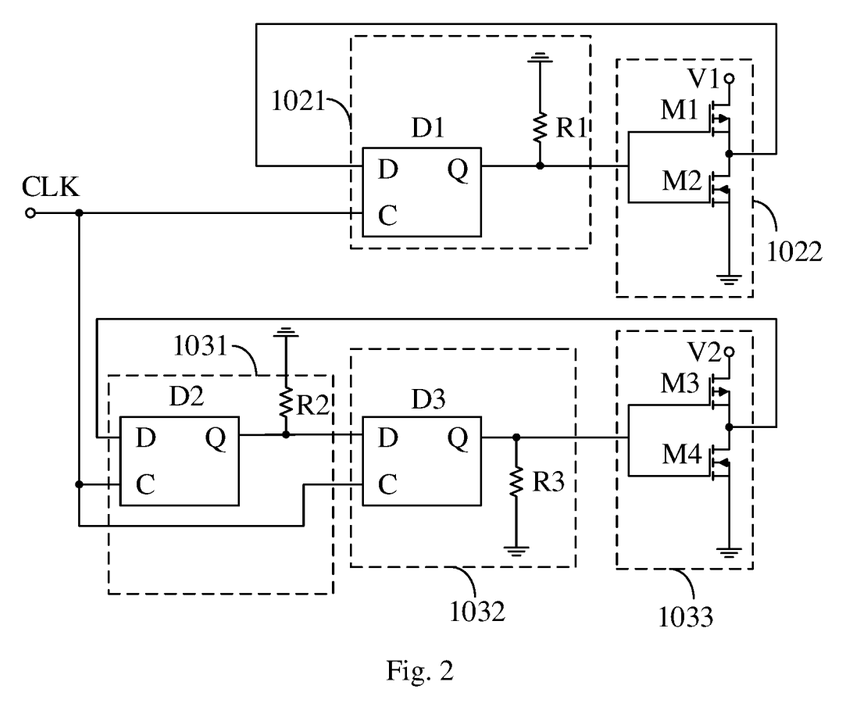
FIG. 2 is a diagram showing the circuit structure of the drive circuit for the display device according to the present application.

In an embodiment of the present application, referring to FIG. 1 and FIG. 2 together, the drive circuit for the display device comprises a timing controller 101, a first drive signal output branch 102, and a second drive signal output branch 103. The first drive signal output branch 102 comprises a signal output end and a controlled end, and the second drive signal output branch 103 comprises a signal output end and a controlled end, the first output end of the timing controller 101 is respectively connected to the controlled end of the first drive signal output branch 102 and the controlled end of the second drive signal output branch 103; the signal output end of the first drive signal output branch 102 is connected to the display device 104. The signal output end of the second drive signal output branch 103 is connected to the display device 104, and the first output end of the timing controller 101 is an I/O port.

Wherein, the first drive signal output branch 102 comprises a first trigger circuit 1021 and a first assignment circuit 1022. Once the timing controller 101 output the drive signal, the first trigger circuit 1021 outputs a first level signal according to the drive signal and a first assignment signal output by the first assignment circuit 1022, and when a rising edge of the drive signal is detected, it will trigger the first assignment circuit 1022 to output a polarity-reversed second assignment signal, so that the first trigger circuit 1021 will output a second level signal based on the drive signal and the second assignment signal, wherein, the plurality of second level signals output by the first trigger circuit in one cycle form one drive signal of the display device. The second drive signal output branch 103 comprises a second trigger circuit 1031, a delay circuit 1032 and a second assignment circuit 1033, the second trigger circuit 1031 outputs a third level signal according to the drive signal and a second assignment signal output by the second assignment circuit 1033, and when a rising edge of the drive signal is detected, it will trigger the second assignment circuit 1033 to output a polarity-reversed fourth assignment signal, so that the second trigger circuit 1031 will output a fourth level signal based on the drive signal and the fourth assignment signal, the delay circuit 1032 delays the fourth level signal and outputs it at the next rising edge of the drive signal as the other drive signal of the display device when the rising edge of the drive signal is detected.

In one embodiment, one cycle of the drive signal comprises N pulses output sequentially. If the first assignment signal and the third assignment signal are both high level signals, and the input value of the delay circuit 1032 is low level, the first assignment circuit 1022 assigns the first assignment signal to the first level signal when the first rising edge of the drive signal is detected, that is, the first drive signal output branch 102 outputs a high level signal to the display device 104. The second assignment circuit 1033 assigns the third assignment signal to the third level signal, the output of the delay circuit 1032 is a low level signal opposite to the third assignment signal, and the delay circuit 1032 outputs the initial value to the display device 104, and it delays the third level signal for a rising edge before outputting, the output value of the delay circuit 1032 is the output value of the second drive signal output branch 103, so the second drive signal output branch 103 outputs a low level signal to the display device 104.

When the second rising edge of the drive signal is detected, the first assignment signal inverts to a second assignment signal of the low level signal, and the first assignment circuit 1022 assigns the first assignment signal to the second level signal, that is, the first drive signal output branch 102 outputs a low level signal to the display device 104. The third assignment signal inverts to a fourth assignment signal of the low level signal, the second assignment circuit 1033 assigns the fourth assignment signal to the fourth level signal, and the output of the delay circuit 1032 is the third level signal that delayed and output at the last rising edge, the output value of the delay circuit 1032 is the output value of the second drive signal output branch 103, so the second drive signal output branch 103 outputs a high level signal to the display device 104.

In summary, when the third rising edge of the drive signal is detected, the first drive signal output branch 102 outputs a high level, and the second drive signal output branch 103 outputs a high level. When the fourth rising edge of the drive signal is detected, the first drive signal output branch 102 outputs a low level, and the second drive signal output branch 103 outputs a low level.

That is, in this embodiment, the value of the initial first assignment signal, the value of the third assignment signal, and the input value of the delay circuit 1032 all can be changed. For example, the values of the first assignment signal and the third assignment signal are high levels, and the input value of the delay circuit 1032 is a low level. Alternatively, multiple implementations can be implemented, such as the first assignment signal is a high level, the third assignment signal is a low level, and the input value of the delay circuit 1032 is a high level. The specific implementation process is as above. Thus, various embodiments for changing the values of the first assignment signal, the third assignment signal, and the input value of the delay circuit 1032 are embodiments in which the principle is consistent with the embodiment above. In this embodiment, the drive signal output by the second drive signal output branch 103 and the drive signal of the first drive signal output branch 102 are combined to form various output outcomes by the delay circuit 1032 and the initial logic level setting. The drive signal output branch can increase the branches as needed, and correspondingly increase the number of delay circuits 1032, the combined output outcomes of various logic signals can be realized, all changes in the combinational logic of the output outcomes for any of the drive signal output branches and the output outcomes of the other remaining drive signal output branches are covered.

Here, the output outcome of any of the combinations can be controlled by the pulse rising edge triggering, so that the control signal input through one IO port can drive a plurality of components of the display device 104 that require different drives. In addition, due to the trigger characteristic of the drive signal output branch of the drive circuit for the display device, it is different from the gating switch in the prior art, so that each drive signal output branch output can be continuously stable drive signal with a good practicability. In addition, in the present application, only a relatively simple circuit is added on the PCB board, and no additional IO port is needed, so that it is possible to realize as many drive controls as possible in a size-limited package PCB board. Therefore, it has great economic value.

In another embodiment, the first drive signal output branch 102 comprises a first trigger circuit 1021 and a first assignment circuit 1022, the second drive signal output branch 103 comprises a second trigger circuit 1031, a delay circuit 1032, and a second assignment circuit 1033. The controlled end of the first trigger circuit 1021 is a controlled end of the first drive signal output branch 102, the input end of the first trigger circuit 1021 is connected to the output end of the first assignment circuit 1022, the connection node of the input end of the first trigger circuit 1021 and the output end of the first assignment circuit 1022 is a signal output end of the first drive signal output branch 102. The controlled end of the second trigger circuit 1031 is connected to the controlled end of the delay circuit 1032, the connection node of the controlled end of the second trigger circuit 1031 and the controlled end of the delay circuit 1032 is a controlled end of the second drive signal output branch 103, the input end of the second trigger circuit 1031 is connected to the output end of the second assignment circuit 1033, the output end of the second trigger circuit 1031 is connected to the input end of the delay circuit 1032, the output end of the delay circuit 1032 is connected to the input end of the second assignment circuit 1033, the connection node of the delay circuit 1032 and the second assignment circuit 1033 is an output end of the second drive signal output branch 103.

Wherein, the first trigger circuit 1021, the second trigger circuit 1031 and the delay circuit 1032 are all controlled by the drive signal input through the IO port, so that the purpose of controlling multiple drive signals through one IO port can be conveniently realized. In addition, the only difference between the first drive signal output branch 102 and the second drive signal output branch 103 is that a delay circuit 1032 is added between the first trigger circuit 1021 and the first assignment circuit 1022, thereby a plurality of transformations of the first output signal and the second output signal are realized with a great flexibility. It does not simply change with the transitions of high and low level of the drive signal. In addition, since the drive signal used has continuity, the first trigger circuit 1021, the second trigger circuit 1031, and the delay circuit 1032 are all controlled by the drive signal input through the IO port, and the output end corresponding to the first trigger circuit 1021 of each drive signal has a corresponding signal output, and therefore, the driving process is not interrupted. Similarly, the output signal of the output end of the second trigger circuit 1031 is not interrupted, and the effect is equivalent to the simultaneous input of a plurality of drive signals, which has a good practicability.

In an embodiment, the first trigger circuit 1021 comprises a first trigger D1 and a first resistor R1, and the first trigger D1 comprises a controlled end, an input end, and an output end. The controlled end of the first trigger D1 is connected to the first output end of the timing controller 101, the input end of the first trigger D1 is an input end of the first trigger circuit 1021, the output end of the first trigger D1 is connected to the first end of the first resistor R1, the connection node of the first trigger D1 and the first resistor R1 is an output end of the first trigger circuit 1021, and the second end of the first resistor R1 is grounded.

Wherein, when the controlled end of the first trigger D1 receives the drive signal output by the timing controller 101, the first assignment signal output by the first assignment circuit 1022 is output. At this time, the first trigger D1 can be operated for a corresponding number of times according to the number of rising edges in the drive signal, so that the first output signal output by the first trigger circuit 1021 can control the output of the corresponding logic level through the pulse signal, and the first drive signal of the first trigger circuit 1021 can control the display device 104. In addition, it is simple to realize the structure of the first trigger circuit 1021. At this time, the second end of the first resistor R1 is grounded, and an initial voltage can be supplied to the first trigger circuit 1021 to facilitate the logic operation of the entire level and avoid interference of the high voltage to the circuit. It can achieve an effect of easily switching the first drive signal output, the control is simple and easy to implement.

The first assignment circuit 1022 comprises a first power switch tube M1 and a second power switch tube M2, the first power switch tube M1 comprises a controlled end, a first connection end, and a second connection end, and the second power switch tube M2 comprises a controlled end, a first connection end and a second connection end. The controlled end of the first power switch tube M1 is connected to the controlled end of the second power switch tube M2, the connection node of the controlled end of the first power switch tube M1 and the controlled end of the second power switch tube M2 is an input end of the first assignment circuit 1022, and the first connection end of the first power switch tube M1 is connected to a first power source, the second connection end of the first power switch tube M1 is connected to the first connection end of the second power switch tube M2, the connection node of the second connection end of the first power switch tube M1 and the first connection end of the second power switch tube M2 is an output end of the first assignment circuit 1022, the second connection end of the second power switch tube M2 is grounded.

Wherein, the first power switch tube M1 and the second power switch tube M2 are both controlled to be turned on or off by the first output signal of the first trigger circuit 1021, and the first power switch tube M1 and the second power switch tube M2 are gating switches, that is, when the first power switch tube M1 is turned on, the second power switch tube M2 is turned off. The first connection end of the first power switch tube M1 is connected to the power source, and the second connection end of the second power switch tube M2 is grounded. When the first power switch tube M1 and the second power switch tube M2 are strobed, the first assignment signal output can be switched between high and low level, a new assignment is made to the first trigger circuit 1021. Therefore, the first assignment circuit 1022 realized has a simple structure and a good effect, and it can quickly realize a logic level transformation function, and has strong practicability.

In an embodiment, the second trigger circuit 1031 comprises a second trigger D2 and a second resistor R2, and the second trigger D2 comprises a controlled end, an input end, and an output end. The controlled end of the second trigger D2 is connected to the first output end of the timing controller 101, the input end of the second trigger D2 is an input end of the second trigger circuit 1031, the output end of the second trigger D2 is connected to the first end of the second resistor R2, the connection node of the second trigger D2 and the second resistor R2 is an output end of the second trigger circuit 1031, and the second end of the second resistor R2 is grounded.

Wherein, when the controlled end of the second trigger D2 receives the drive signal output by the timing controller 101, the second assignment signal output by the second assignment circuit 1033 is output. At this time, the second trigger D2 can be operated for a corresponding number of times according to the number of rising edges in the drive signal, so that the second drive signal output can control the output of the corresponding logic level through the drive signal, and the second drive signal of the second trigger circuit 1031 can control the display device. In addition, it is simple to realize the structure of the second trigger circuit 1031. At this time, the second end of the first resistor R1 is grounded, and an initial voltage can be supplied to the second trigger circuit 1031 to facilitate the logic operation of the entire level. It can achieve an effect of easily switching the second drive signal output, and is easy to control.

In an embodiment, the second assignment circuit 1033 comprises a third power switch tube M3 and a fourth power switch tube M4, the third power switch tube M3 comprises a controlled end, a first connection end, and a second connection end, and the fourth power switch tube M4 comprises a controlled end, a first connection end and a second connection end, the controlled end of the third power switch tube M3 is connected to the controlled end of the fourth power switch tube M4, the connection node of the controlled end of the third power switch tube M3 and the controlled end of the fourth power switch tube M4 is an input end of the second assignment circuit 1033, and the first connection end of the third power switch tube M3 is connected to a second power source, the second connection end of the third power switch tube M3 is connected to the first connection end of the fourth power switch tube M4, the connection node of the second connection end of the third power switch tube M3 and the first connection end of the fourth power switch tube M4 is an output end of the second assignment circuit 1033, the second connection end of the fourth power switch tube M4 is grounded.

Wherein, the third power switch tube M3 and the fourth power switch tube M4 are both controlled to be turned on or off by the output end of the delay circuit 1032, and the third power switch tube M3 and the fourth power switch tube M4 are gating switches, that is, when the third power switch tube M3 is turned on, the fourth power switch tube M4 is turned off. The first connection end of the third power switch tube M3 is connected to the power source, and the second connection end of the fourth power switch tube M4 is grounded. When the third power switch tube M3 and the fourth power switch tube M4 are strobed, a new assignment is made to the first trigger circuit 1021 by switching the first assignment signal output between high and low level. The output is delayed by the output end of the delay circuit 1032, so that it can quickly realize a logic level transformation function.

Further, the delay circuit 1032 comprises a third trigger D3 and a third resistor R3, the controlled end of the third trigger D3 is connected to the first output end of the timing controller 101, the input end of the third trigger D3 is an input end of the third trigger module, the output end of the third trigger D3 is connected to the first end of the third resistor R3, and the connection node of the third trigger D3 and the third resistor R3 is an output end of the third trigger module; the second end of the third resistor R3 is grounded.

Wherein, when the controlled end of the third trigger D3 receives the drive signal output by the timing controller 101, the last second assignment signal of the second assignment circuit 1033 stored by the delay circuit 1032 is output. At this time, the third trigger D3 can be operated for a corresponding number of times according to the number of rising edges in the drive signal, so that the third drive signal output can control the output of the corresponding logic level through the drive signal, and the third drive signal of the delay circuit 1032 can control the display device. At this time, it is simple to realize the structure of the delay circuit 1032. In addition, in case that the second end of the third resistor R3 is grounded, and an initial voltage can be supplied to the delay circuit 1032 to facilitate the logic operation of the entire level. It can achieve an effect of easily switching the third drive signal output, and is easy to control.

In an embodiment, the first power switch tube M1 and the second power switch tube M2 are MOS transistors or triodes.

Wherein, when the first power switch tube M1 and the second power switch tube M2 are MOS transistors or triodes, the first power switch tube M1 and the second power switch tube M2 can be directly controlled to be turned on or off through high and low levels, gating can be realized by selecting the type of MOS transistors or triodes, thus assigning values to subsequent outputs, achieving the purpose of switching between high and low levels.

In an embodiment, the third power switch tube M3 and the fourth power switch tube M4, the third power switch tube M3 and the fourth power switch tube M4 are MOS transistors or triodes.

Wherein, when the third power switch tube M3 and the fourth power switch tube M4 are MOS transistors or triodes, the first power switch tube M1 and the second power switch tube M2 can be directly controlled to be turned on or off through high and low levels, gating can be realized by selecting the type of MOS transistors or triodes, thus assigning values to subsequent outputs, achieving the purpose of switching between high and low levels.

In an embodiment, the first power switch tube M1 and the third power switch tube M3 are both P-MOS transistors.

In an embodiment, the second power switch tube M2 and the fourth power switch tube M4 are both N-MOS transistors.

Wherein, the P-MOS transistor is turned on at a low level, and the N-MOS transistor is turned on at a high level, so that the gating of the switch can be realized. At this time, the boundary between the high and low levels is relatively obvious, and the probability of occurrence of errors is relatively small, thereby a better control result is realized.

In an embodiment, the first trigger D1, the second trigger D2, and the third trigger D3 are all rising edge D triggers.

Wherein, each of the first trigger D1, the second trigger D2 and the third trigger D3 comprises a D end, a Q end and a C end, and the C end is a controlled end of the trigger, detecting the rising edge of the pulse signal. The D end is configured to assign the value of the D end to the C end when a rising edge is detected at the C end, thus the effect of triggering and timely assignment can be realized. If there are multiple triggers in series, the subsequent triggers will assign the Q end of the previous one wherein no rising edge has been detected yet to the Q end of the subsequent triggers when a rising edge is detected. Therefore, the effect of the delay can be realized, causing multiple variations in the logic level output and covering all types.

Referring to FIG. 1 and FIG. 2 together, the working principle of the drive circuit for the display device of this embodiment is specifically described as follows:

Wherein, the source electrode of the first power switch tube M1 is connected to the first power source, and is a logic high level H; the source electrode of the second power switch tube M2 is grounded, and is a logic low level L, the first resistor R1, the second resistor R2 and the third resistor R3 are grounding resistors. The second power switch tube M2 and the fourth power switch tube M4 are N-MOS transistors. When the gate electrode control signal thereof is at a high level H, the second power switch tube M2 and the fourth power switch tube M4 are turned on; when the gate electrode input signal thereof is at a low level L, the second power switch tube M2 and the fourth power switch tube M4 are turned off. The first power switch tube M1 and the third power switch tube M3 are P-MOS transistors. When the gate electrode control signal thereof is L, the first power switch tube M1 and the third power switch tube M3 are turned on; when the gate electrode input signal thereof is H, the first power switch tube M1 and the third power switch tube M3 are turned off. The first trigger D1, the second trigger D2 and the third trigger D3 are rising edge D triggers, and the specific implementation of their function is that when the C end of the control terminal receives the rising edge of the pulse signal, the logic level of the D end thereof is assigned to the Q end such that the logic control signals are generated at the output end A of the first drive signal output branch 102 and the output end B of the first drive signal output branch 102. The pulse signal CLK is a control signal output from the I/O port.

The initial state of the drive circuit for the display device is:

Since the first resistor R1 and the third resistor R3 are grounded, the output of the first output end A and the second output end B of the drive circuit for the display device are both at low level L, and at this time, the first power switch tube M1 and the third power switch tube M3 are turned on, the second power switch tube M2 and the fourth power switch tube M4 are turned off, the D value of the second trigger D2 is a high level H, the D value of the third trigger D3 is a low level L, and the D value of the first trigger D1 is a high level H;

When the first rising edge of the pulse signal CLK arrives, the second trigger D2 assigns its D value of high level H to the Q end, the third trigger D3 assigns its D value of low level L to the Q end, and the first trigger D1 assigns its D value of H to the Q end. At this time, the logic level of the C end is a high level H, and the logic level of the second output end B of the drive circuit for the display device is a low level L, and the display, the logic level of the first output end A of the drive circuit for the display device is a high level H. At this time, the second power switch tube M2 and the third power switch tube M3 are turned on, the first power switch tube M1 and the fourth power switch tube M4 are turned off, the D value of the second trigger D2 is a high level H, the D value of the third trigger D3 is a high level H, and the D value of the first trigger D1 is a low level L;

Similarly: when the second rising edge of the pulse signal CLK arrives, the output of the first output end A of the drive circuit for the display device is a low level L, and the output of the second output end B of the drive circuit for the display device is a high level H;

When the third rising edge of the pulse signal CLK arrives, the output of the first output end A of the drive circuit for the display device is a high level H, and the output of the second output end B of the drive circuit for the display device is a high level H.

In summary, the logic levels of A and B can be set respectively by controlling the number of rising edges of the output pulse signal CLK. That is, two logic signals can be set by using only one I/O port.

In this embodiment, the drive circuit for the display device controls the output of two set logic level signals by the pulse signal CLK outputted by the I/O port and the first drive signal output branch 102 and the second drive signal output branch 103. Therefore, two or more adjustable and ongoing logic drive signals can be provided through one I/O port, that is, the drive circuit for the display device in this embodiment solves the problem that the number of I/O ports of the existing display device is insufficient.

To achieve the purpose above, the present application provides a display device, comprising the drive circuit for the display device above.

It can be understood that since the drive circuit for the display device described above is used in the display device of the present application, the embodiments of the display device of the present application include all the technical solutions of all the embodiments of the drive circuit for the display device described above, and the technical effects achieved are also completely the same, and will not be repeated here.

To achieve the purpose above, the present application also provides a display panel, comprising the display device described above.

It can be understood that since the display device described above is used in the display panel of the present application, the embodiments of the display panel of the present application include all the technical solutions of all the embodiments of the display device described above, and the technical effects achieved are also completely the same, and will not be repeated here.

The above mentioned is only the preferred embodiment of the present application, which does not limit the patent scope of the present application, and any equivalent structure transformation made by using the specification and the drawings of the present application or direct/indirect applications in other related technical fields should be contained in the scope of patent protection in a similar way.

The invention claimed is:

1. A drive circuit of a display device, comprising:
a timing controller having a drive signal output end configured to output a drive signal, wherein a cycle of the drive signal includes N pulses that output sequentially;
a first drive signal output branch, comprising a first trigger circuit and a first assignment circuit, the first trigger circuit is configured to output a first level signal according to the current pulse of the drive signal and a first assignment signal output by the first assignment circuit, and when a rising edge of the drive signal is detected, it will trigger the first assignment circuit to output a polarity-reversed second assignment signal, so that the first trigger circuit will output a second level signal based on the current pulse of the drive signal and the second assignment signal;
wherein, the plurality of second level signals output by the first trigger circuit in one cycle form one drive signal of the display device;
a second drive signal output branch, comprising a second trigger circuit, a delay circuit and a second assignment circuit, the second trigger circuit is configured to output a third level signal according to the drive signal and a third assignment signal output by the second assignment circuit, and when a rising edge of the drive signal is detected, it will trigger the second assignment circuit to output a polarity-reversed fourth assignment signal, so that the second trigger circuit will output a fourth level signal based on the drive signal and the fourth assignment signal, the delay circuit delays the fourth level signal and outputs it at the next rising edge of the drive signal as the other drive signal of the display device when the rising edge of the drive signal is detected;

wherein, the first trigger circuit comprises a first trigger and a first resistor, and the first trigger comprises a controlled end, an input end and an output end; the controlled end of the first trigger is connected to the first output end of the timing controller, the input end of the first trigger is an input end of the first trigger circuit, the output end of the first trigger is connected to the first end of the first resistor, and the connection node of the first trigger and the first resistor is an output end of the first trigger circuit the second end of the first resistor is grounded.

2. The drive circuit according to claim 1, wherein the first drive signal output branch comprises a signal output end and a controlled end, and the second drive signal output branch comprises a signal output end and a controlled end, the first output end of the timing controller is respectively connected to the controlled end of the first drive signal output branch and the controlled end of the second drive signal output branch; the signal output end of the first drive signal output branch is connected to the first port of the display device, and the signal output end of the second drive signal output branch is connected to the second port of the display device.

3. The drive circuit according to claim 1, wherein the first assignment circuit comprises a first power switch tube and a second power switch tube, the first power switch tube comprises a controlled end, a first connection end, and a second connection end, and the second power switch tube comprises a controlled end, a first connection end and a second connection end; the controlled end of the first power switch tube is connected to the controlled end of the second power switch tube, the connection node of the controlled end of the first power switch tube and the controlled end of the second power switch tube is an input end of the first assignment circuit, and the first connection end of the first power switch tube is connected to a first power source, the second connection end of the first power switch tube is connected to the first connection end of the second power switch tube, the connection node of the second connection end of the first power switch tube and the first connection end of the second power switch tube is an output end of the first assignment circuit; the second connection end of the second power switch tube is grounded.

4. The drive circuit according to claim 3, wherein the first power switch tube and the second power switch tube are MOS transistors or triodes.

5. The drive circuit according to claim 4, wherein the first power switch tube and the third power switch tube are P-MOS transistors.

6. The drive circuit according to claim 4, wherein the second power switch tube and the fourth power switch tube are N-MOS transistors.

7. The drive circuit according to claim 1, wherein the second trigger circuit comprises a second trigger and a second resistor, and the second trigger comprises a controlled end, an input end and an output end; the controlled end of the second trigger is connected to the first output end of the timing controller, the input end of the second trigger is an input end of the second trigger circuit, the output end of the second trigger is connected to the first end of the second resistor, and the connection node of the second trigger and the second resistor is an output end of the second trigger circuit; the second end of the second resistor is grounded.

8. The drive circuit according to claim 7, wherein the delay circuit comprises a third trigger and a third resistor, the controlled end of the third trigger is connected to the first output end of the timing controller, the input end of the third trigger is an input end of the third trigger module, the output end of the third trigger is connected to the first end of the third resistor, and the connection node of the third trigger and the third resistor is an output end of the third trigger module; the second end of the third resistor is grounded.

9. The drive circuit according to claim 8, wherein the first trigger, the second trigger and the third trigger are respectively rising edge D triggers.

10. The drive circuit according to claim 1, wherein the second assignment circuit comprises a third power switch tube and a fourth power switch tube, the third power switch tube comprises a controlled end, a first connection end, and a second connection end, and the fourth power switch tube comprises a controlled end, a first connection end and a second connection end; the controlled end of the third power switch tube is connected to the controlled end of the fourth power switch tube, the connection node of the controlled end of the third power switch tube and the controlled end of the fourth power switch tube is an input end of the second assignment circuit, and the first connection end of the third power switch tube is connected to a second power source, the second connection end of the third power switch tube is connected to the first connection end of the fourth power switch tube, the connection node of the second connection end of the third power switch tube and the first connection end of the fourth power switch tube is an output end of the second assignment circuit; the second connection end of the fourth power switch tube is grounded.

11. A display device, comprising the drive circuit according to claim 1.

12. The display device according to claim 11, wherein the first assignment circuit comprises a first power switch tube and a second power switch tube, the first power switch tube comprises a controlled end, a first connection end, and a second connection end, and the second power switch tube comprises a controlled end, a first connection end and a second connection end;

the controlled end of the first power switch tube is connected to the controlled end of the second power switch tube, the connection node of the controlled end of the first power switch tube and the controlled end of the second power switch tube is an input end of the first assignment circuit, and the first connection end of the first power switch tube is connected to a first power source, the second connection end of the first power switch tube is connected to the first connection end of the second power switch tube, the connection node of the second connection end of the first power switch tube and the first connection end of the second power switch tube is an output end of the first assignment circuit; the second connection end of the second power switch tube is grounded.

13. The display device according to claim 11, wherein the second trigger circuit comprises a second trigger and a second resistor, and the second trigger comprises a controlled end, an input end and an output end; the controlled end of the second trigger is connected to the first output end of the timing controller, the input end of the second trigger is an input end of the second trigger circuit, the output end of the second trigger is connected to the first end of the second resistor, and the connection node of the second trigger and the second resistor is an output end of the second trigger circuit; the second end of the second resistor is grounded.

14. The display device according to claim 13, wherein the delay circuit comprises a third trigger and a third resistor, the controlled end of the third trigger is connected to the first output end of the timing controller, the input end of the third trigger is an input end of the third trigger module, the output end of the third trigger is connected to the first end of the third resistor, and the connection node of the third trigger and the third resistor is an output end of the third trigger module; the second end of the third resistor is grounded.

15. The display device according to claim 14, wherein the first trigger, the second trigger and the third trigger are respectively rising edge D triggers.

16. The display device according to claim 13, wherein the first power switch tube and the second power switch tube are MOS transistors or triodes.

17. The display device according to claim 11, wherein the second assignment circuit comprises a third power switch tube and a fourth power switch tube, the third power switch tube comprises a controlled end, a first connection end, and a second connection end, and the fourth power switch tube comprises a controlled end, a first connection end and a second connection end;

the controlled end of the third power switch tube is connected to the controlled end of the fourth power switch tube, the connection node of the controlled end of the third power switch tube and the controlled end of the fourth power switch tube is an input end of the second assignment circuit, and the first connection end of the third power switch tube is connected to a second power source, the second connection end of the third power switch tube is connected to the first connection end of the fourth power switch tube, the connection node of the second connection end of the third power switch tube and the first connection end of the fourth power switch tube is an output end of the second assignment circuit; the second connection end of the fourth power switch tube is grounded.

18. A display panel, comprising the display device according to claim 11.

* * * * *